(No Model.)

E. DAVIS.
INKSTAND.

No. 413,390. Patented Oct. 22, 1889.

WITNESSES:

INVENTOR
E. Davis
BY
Munn & Co.
ATTORNEY

UNITED STATES PATENT OFFICE.

EMRY DAVIS, OF KANE, PENNSYLVANIA.

INKSTAND.

SPECIFICATION forming part of Letters Patent No. 413,390, dated October 22, 1889.

Application filed March 22, 1889. Serial No. 304,272. (No model.)

*To all whom it may concern:*

Be it known that I, EMRY DAVIS, of Kane, in the county of McKean and State of Pennsylvania, have invented a new and Improved Inkstand, of which the following is a full, clear, and exact description.

The object of my invention is to provide a cheap and practical inkstand, constructed to avoid almost altogether the evaporation of ink, the stand being provided with an apertured float which carries the dip-funnel above the cover, and is adapted to be depressed by pressure of the pen at the funnel to elevate the ink to the funnel by displacement.

The invention consists, principally, in the employment of a check in the ink-passage through the float to prevent the ink from being forced in a jet up into the dip-funnel.

The invention also consists in the employment of a double-walled cover forming a chamber to catch and return any overflow of ink.

The invention finally consists in the construction, arrangement, and combination of parts, all as hereinafter described and claimed.

Reference is to be had to the accompanying drawings, forming part of this specification, in which similar letters of reference indicate corresponding parts in all the figures.

Figure 1:
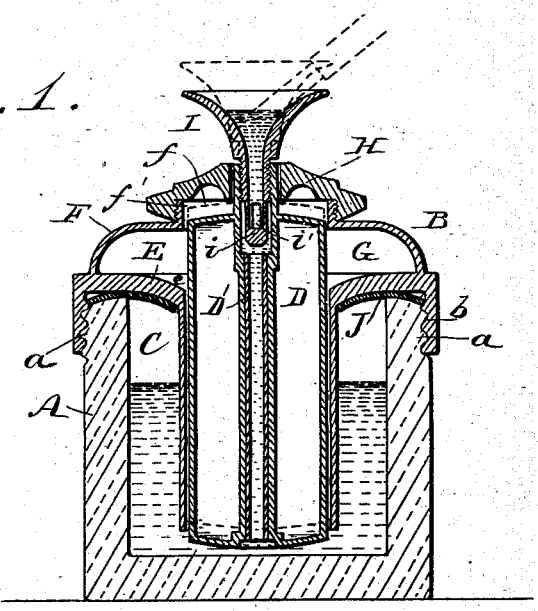
Figure 2:
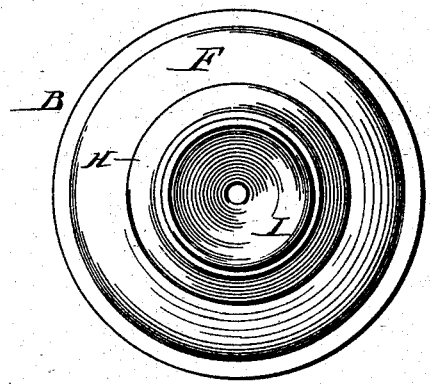
Figure 3:
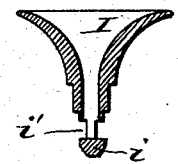

Figure 1 is a sectional elevation of my improved inkstand. Fig. 2 is a plan view of the same, and Fig. 3 is a sectional view of the dip-funnel removed.

A represents the body of the inkstand, of glass or any other suitable material, and formed with the screw-threads $a$ at the top. The main cover B is by preference made of hard rubber. It is formed with the screw-threaded flange $b$ to fit the threads $a$; but other means for attaching the cover to the body may be employed, if desired.

C is the tube to receive the float D. This tube is by preference made a part of the cover B, and is formed as a part of the annular plate E, as shown clearly in Fig. 1; and the tube reaches down nearly to the bottom of the ink space or well. The said plate E is by preference made an integral part of the main cover, and above this plate rises the top or dome F. This dome and the plate E form the overflow space or chamber G, and the plate E is carried downward, as shown at $e$, to lead back into the well any ink that may rise through the tube C or between its walls and the float D. In the center of the dome F is formed the opening $f$, which is of the same diameter as the tube C and coincident therewith, and this opening is surrounded by the inwardly-projecting screw-threaded flange or collar $f'$, on which is screwed the supplemental annular cover H, in the central opening of which fits the upper end of the tube D' of the float D. This tube reaches down through the float and is the passage through which the ink is elevated to the funnel I when the float is depressed or forced downward into the well, as illustrated in Fig. 1.

The dip-funnel screws into the top of the tube D', and its lower end is formed with the check $i$, which prevents the ink from being forced in a jet up into the funnel when the float and funnel are forced downward by pressure on the pen placed in the funnel. The check $i$, instead of being made a part of the funnel, may be placed anywhere in the passage D'. The ink, after passing the check $i$, enters the funnel through the openings $i'$ above the check.

At the top of the inkstand A is placed the ring J, of soft rubber, felt, leather, or any other suitable material, to be compressed when the cover is screwed down to make a liquid and air tight connection of the cover to the stand.

In use the body A is filled nearly to the top with ink. The cover B is then simply screwed down tight upon the body A. Normally the float D will be held by the ink with its upper end against the supplemental cover H, in which position the ink in the tube D' will recede to a level of the ink in the stand A, so that only a very small surface is exposed to the external air, and hence the evaporation is reduced to a minimum. In dipping the pen a slight pressure therewith must be exerted in the dip-funnel I, which forces the float D down in the tube C and into the ink, and by displacement causes the ink to rise rapidly in the tube D' and fill the funnel and supply the pen. On lifting the pen the float rises and the ink recedes. The upward flow of ink is checked by the part $i$, so that all upward spurting or too rapid gush of the ink is prevented.

Having thus described my invention, what I claim as new, and desire to secure by Letters Patent, is—

1. An inkstand provided with a cover, combined with a tube fitted in the cover, a float placed in the tube, a dip-funnel fitted in the float, and a check placed in the passage of the float, substantially as and for the purposes described.

2. The cover B, formed with a plate E and surrounding flange $b$, the plate E being formed with a tube C, which projects down into the ink-well, substantially as described.

3. The cover B, formed with the plate E and dome F, having opening $f$, the said dome and plate forming a space G, substantially as and for the purposes set forth.

4. The cover B, formed with the plate E, having tube C, and the dome F, having opening $f$, which coincides with the said tube C, substantially as described.

5. The cover B, formed with the surrounding flange $b$, plate E, having tube C, and the dome F, having opening $f$, which coincides with the tube C, substantially as shown and described.

6. The cover B, formed with plate E, having tube C, and dome F, having opening $f$, in combination with the supplemental cover H, float D, tube D′, and dip-funnel I, substantially as described.

EMRY DAVIS.

Witnesses:
A. D. CLARK,
F. M. BROODER.